US012410012B1

(12) United States Patent
Patel et al.

(10) Patent No.: US 12,410,012 B1
(45) Date of Patent: Sep. 9, 2025

(54) SYSTEMS AND METHODS FOR EFFICIENT PACKAGE SORTING FOR DELIVERY

(71) Applicant: Amazon Technologies, Inc., Seattle, WA (US)

(72) Inventors: Shreyash Dhirendra Patel, Sammamish, WA (US); William Casey McIntyre, Jr., Snohomish, WA (US); Nicholas Adam Wagner, Everett, WA (US); Julie Mitchell, Lynnfield, MA (US); Varun Adhityaa Sridharan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 703 days.

(21) Appl. No.: 17/853,175

(22) Filed: Jun. 29, 2022

(51) Int. Cl.
| | |
|---|---|
| *B65G 1/137* | (2006.01) |
| *B07C 3/00* | (2006.01) |
| *B07C 3/08* | (2006.01) |
| *B25J 9/16* | (2006.01) |
| *B65G 1/04* | (2006.01) |
| *B65G 1/06* | (2006.01) |
| *B65G 43/08* | (2006.01) |
| *B66F 9/06* | (2006.01) |

(Continued)

(52) U.S. Cl.
CPC ............ *B65G 1/1371* (2013.01); *B07C 3/008* (2013.01); *B07C 3/08* (2013.01); *B25J 9/162* (2013.01); *B65G 1/0492* (2013.01); *B65G 1/06* (2013.01); *B65G 1/065* (2013.01); *B65G 43/08* (2013.01); *B66F 9/063* (2013.01); *G06K 7/10366* (2013.01); *G06K 7/1413* (2013.01); *B65G 2201/0285* (2013.01)

(58) Field of Classification Search
CPC ...... B65G 1/1371; B65G 1/0492; B65G 1/06; B65G 1/065; B65G 43/08; B65G 2201/0285; B07C 3/008; B07C 3/08; B25J 9/162; B66F 9/063; G06K 7/10366; G06K 7/1413
See application file for complete search history.

(56) References Cited

U.S. PATENT DOCUMENTS

| | | | | |
|---|---|---|---|---|
| 5,959,868 A | * | 9/1999 | Oppliger | .................. B07C 3/06 700/226 |
| 9,378,482 B1 | * | 6/2016 | Pikler | .................. G05D 1/0297 |

(Continued)

*Primary Examiner* — Thomas Randazzo
(74) *Attorney, Agent, or Firm* — Eversheds Sutherland (US) LLP

(57) ABSTRACT

Systems, methods, and computer-readable media are disclosed for package sorting systems that facilitate efficient package sorting for delivery. The package sorting system may be a multi-level or single-level fulfillment or sortation center. The package sorting system may include a receiving area for receiving a large volume of packages and placing the packages into containers. The containers may be transported to an unloading area, which may be on a second story. At the unloading area, the packages may be unloaded from containers and placed into destination bins, each package in a destination bin destined for delivery within close proximity to one another. The destination container may be transported to a delivery area. At the delivery area the packages may be loaded into delivery vehicles for distributing the packages. The package sorting system may include drive units and package drive units for transporting containers and/or packages.

20 Claims, 10 Drawing Sheets

(51) Int. Cl.
*G06K 7/10* (2006.01)
*G06K 7/14* (2006.01)

(56) References Cited

U.S. PATENT DOCUMENTS

| | | | |
|---|---|---|---|
| 9,555,978 B1* | 1/2017 | Hanssen | B65G 1/1378 |
| 11,254,506 B1* | 2/2022 | Robin | B07C 3/18 |
| 11,319,152 B1* | 5/2022 | Campbell | B65G 1/1375 |
| 2017/0043953 A1* | 2/2017 | Battles | G06Q 10/087 |
| 2018/0079626 A1* | 3/2018 | Brady | B66B 9/00 |

* cited by examiner

SYSTEMS AND METHODS FOR EFFICIENT PACKAGE SORTING FOR DELIVERY

BACKGROUND

With the popularity of e-commerce and delivery services, the volume of packages delivered continues to increase. The high volume of packages requires delivery fulfillment centers and/or sorting centers capable of receiving, sorting, and distributing a very large volume of packages. For example, a fulfillment and/or sorting center may fulfill millions of orders a year. As a result fulfillment and/or sorting centers will receive and package millions of items for delivery. To ensure each package is efficiently routed to an appropriate delivery address, each package must be sorted based on delivery destinations and packages having delivery addresses within proximity of one another and/or along a specified delivery route must be gathered for delivery. As large fulfillment and/or sorting centers can range from several hundred thousand to even a million square feet, sorting and routing packages for efficient and accurate delivery is a challenge. Accordingly, there is a need for a reliant and efficient approach to package induction, sorting, and distribution at such fulfillment and/or sorting centers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
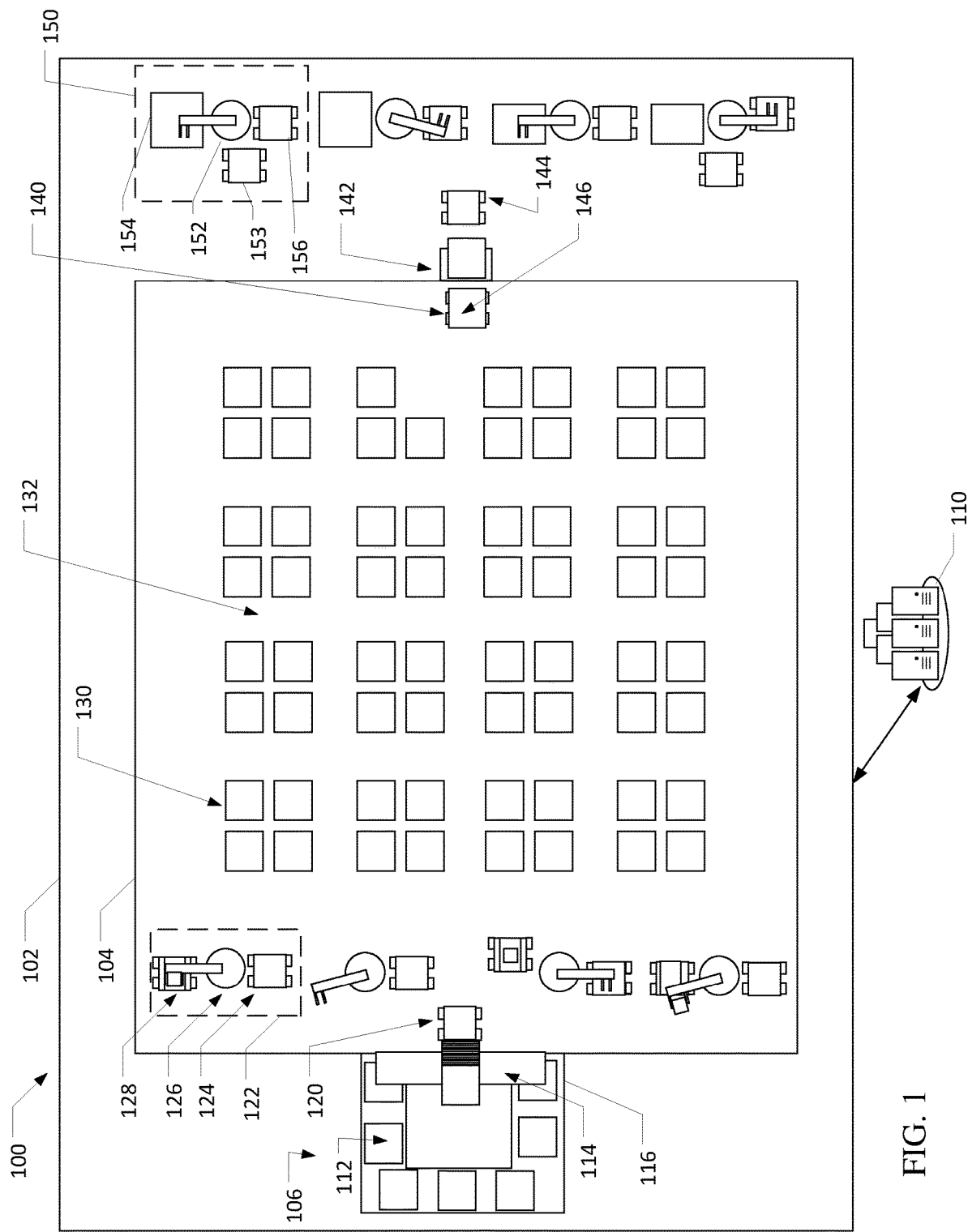
FIG. 1 is a schematic illustration of an example use case a multi-level package sorting system in accordance with one or more exemplary embodiments of the disclosure.

Multi-level and single-level package sorting systems and methods are provided herein. The package sorting systems may be fulfillment centers that may be designed to receive, induct, sort, and/or distribute for delivery a large volume of packages (e.g., thousands, millions, billions, of packages per year). For example, the package sorting system may be a fulfillment center having several hundred thousand, a million, or more square feet and may deliver millions of packages per year. The term fulfillment center used herein is understood to include any fulfillment, sorting, and/or transportation center.

The package sorting system may include a package receiving area where various packages are received and deposited into containers. The containers at the receiving area may be agnostic to the ultimate delivery destination of each package in a given container (e.g., the delivery destinations in each container at the receiving area may be far from one another). Alternatively, or additionally, the contents of each container may be known and that information may be used in the sortation process. Each container may hold several packages and may be designed to be loaded onto a drive unit with wheels such that the drive unit can move around the fulfillment center.

A fulfillment center may be multi-level and may include one or more container lifts designed to transfer a container from one level of the fulfillment center to another level. In one example, the receiving area may be located on a first level and package induction and sorting may take place on a second level. A container lift may transfer the container from the first floor to the second floor. On the second floor the container may be transported (e.g., via a drive unit) to an unloading area having a robotic arm and a package drive unit, designed to deposit a package into a container. It is understood that more than two levels may be alternatively used. For example, a five level structure may be used in which the first level may include a receiving area and the second, third, fourth and/or fifth levels may be used for package induction and sorting and each level may be connected to the first level via a lift system.

The robotic arm may unload and/or singulate a package from the container and place the package upon the package drive unit. In this manner, packages may be sorted in any manner (e.g., packages all going to the same destination or destined for the same delivery vehicle may be sorted by size). It is understood that instead of a robotic arm, a singulation system (e.g., a singulation conveyor system) may be employed to singulate packages and direct packages to certain drive units and/or containers (e.g., destination containers). A destination container on the second floor may correspond to the delivery address associated with the package and therefore the package drive unit may transport the package to the destination container and deposit the package into the destination container. The destination container may include several packages all having a delivery address in close proximity and/or along the same delivery route, for example.

Once the destination container is sufficiently filled with packages, a drive unit may load the destination package and transport the destination container to a container lift. The container lift may then transfer the destination container and optionally the drive unit back to the first floor. A delivery loading area may be on the first floor. The container may be transferred (e.g., manually or via a drive unit) to a delivery area assigned to that specific container. For example, the delivery area may include a delivery container to be loaded on a delivery truck assigned to the delivery route corresponding to the addresses of the packages in the destination container.

A loader (e.g., robotic package moving system having at least one robotic arm) may load the delivery container. The delivery container may be a type of box or container compatible with and/or specific to the delivery vehicle for which it will be loaded. The loader may strategically place the package in the destination container into the delivery container to optimize the space within the delivery container. It is understood that packages from multiple destination containers may fill a single delivery container.

Referring to FIG. 1, an example use case of a multi-level package sorting system 100 is depicted in accordance with one or more exemplary embodiments of the disclosure. Package sorting system 100 may be a package fulfillment center having several items and/or packages and may be designed to receive, induct, sort, and/or distribute for delivery items and/or packages. As shown in FIG. 1, package sorting system 100 may include first floor 102 and second floor 104 which may be positioned above first floor 102. First floor 102 may include one or more receiving area 106 and one or more delivery areas 150. Computing device 110 may be any computing device with a processor.

Computing device 110 may facilitate communication to and/or between components of package sorting system 100 (e.g., conveyors, drive units, robotic systems, etc.), may process information, and/or perform operations and tasks described herein. It is understood that computing device 110 may be one or more computing devices. Computing device 110 may be one or more severs, computers, desktop computers, laptop computers, datastores, and/or any other electronic or computing device. Additionally, the computing device 110 may communicate with one or more server (e.g., remote server) via any well-known wired or wireless system. In one example, computing device may be computing device 1000 of FIG. 10.

It is understood that one or more components of first floor 102 and/or second floor 104 may include computing devices (not shown) that may be in contact with computing device 110. In the illustrated example, the computing device 110 may communicate with one or more conveyor system, lift system, robotic system, drive unit and/or any other systems and/or components of package sorting system 100. Computing device 110 may communicate with other computing devices (e.g., components, systems, device of first floor 102 and/or second floor 104) via any well-known wired or wireless system (e.g., Bluetooth, Bluetooth Low Energy (BLE), near field communication protocol, Wi-Fi, cellular network, etc.).

Package sorting system 100 may receive packages and/or items (i.e., non-packaged products) at receiving area 106. While packages are references throughout, it is understood that items may be sorted and distributed instead. Receiving area 106 may be positioned on first floor 102 and may receive loads or deliveries of packages. The packages may be deposited (e.g., either manually or in automated fashion) in containers, such as container 112. Container 112 may be any type of rigid or semi-rigid container that is designed to hold multiple packages.

Container 112 may be positioned upon a lift conveyor 116 (e.g., a conveyor belt, rollers, moving floor, chutes, and/or any other conveyor device) that may transport container 112 towards container lift 114. Container lift 114 may be any type of lift system designed to move a container from a first position on first floor 102 to a second position on second floor 104, which may be above first floor 102. It is understood that second floor 104 may alternatively be positioned below first floor 102 and/or first floor 102 and second floor 104 may be non-consecutive floors. Container lift 114 may raise container 112 to the height of second floor 104 or a height higher than second floor 104.

Upon reaching second floor 104, container 112 may be positioned or loaded upon drive unit 120. Drive unit 120 may be any type of vehicle having one or more wheel and/or power unit and designed to carry a container from one location to another. For example, drive unit 120 may have four wheels, an electric engine, and may carry a container (e.g., container 112) on top of drive unit 120. In one example, container 112 may be ejected from container lift 114 at a height sufficient to load container 112 on top of drive unit 120 (e.g., container lift 114 may eject container 112 onto rollers that deposit container 112 on top of drive unit 120.

Drive unit 120 may transport container 112 to an unloading area on second floor 104. For example, second floor 104 may have several areas dedicated to unloaded containers (e.g., container 112) and each unloading area may include one or more unloader, which may be a robotic device that is designed to grab a package from the container and place the package onto a package drive unit. For example, the robotic device may have a robot arm with a robotic hand or grasper and may have multiple degrees of freedom (e.g., 6).

In one example, package drive unit 124 may be instructed to drive to and remain at unloading area 122 (e.g., after completing a previous task). Unloader 126 may then unload a package from a container (e.g., container 114) and place the container onto package drive unit 128. The package may be scanned or otherwise identified at unloading area 122. For example, a scanning device may be incorporated into unloader 126 and/or may be a standalone component in unloading area 122 and may scan a bar code or other unique identifier (e.g., RFID tag) of the package. It is understood that instead of an unloader 126, a singulation system (e.g., a singulation conveyor system) may be employed to singulate packages and direct packages to certain drive units and/or containers (e.g., destination containers).

The scanning device may determine a delivery address and/or other destination information of the package (e.g., a scanned package identifier may be associated with a certain address). The delivery address and/or destination information may be communicated to the package drive unit 124 and/or computing device 110. Package drive unit 128 and/or computing device 110 may determine a destination container on second floor 104 that corresponds to and/or is associated with the delivery address, destination information, and/or package. Second floor 104 may support several (e.g., dozens or more) destination containers (e.g., destination container 130) in sorting area 132.

Each destination container may be assigned (e.g., by computing device 110) packages having delivery addresses within a certain proximity of one another, along the same delivery route, and/or intended to be delivered by the same delivery vehicle. Similar to container 112, destination container may be any type of rigid or semi-rigid container that is designed to hold multiple packages. Container 112 and designation container 130 may be the same type of container or may be different types of containers.

Destination containers may be arranged in rows and columns on second floor 104 in sorting area 132. In one example, destination containers (e.g., destination container 130) may be arranged in pods of 4 as shown in FIG. 1. It is understood that destination containers may be arranged in sorting area 132 in any other manner suitable for efficient depositing of packages into the destination containers. Destination containers may include one or more sensors for determining when the container is full. The destination container may send a message to computing device 110 when it is full.

Upon determining that the destination container is full, computing device 110 may cause drive unit 140, which may be the same or similar to drive unit 120, but designed to load and transport the destination container (e.g., destination container 130) to a container lift near one or more delivery area (e.g., delivery area 150). For example, drive unit 140 may have loaded destination container 146, which may be the same type of container as destination container 130, and may load destination container 146 onto container lift 142. Container lift 142 may transfer destination container 146 and drive unit 140 to first floor 102 or may be the same or similar to container lift 114.

Container lift 142 may be positioned near one or more delivery areas (e.g., delivery area 150). Upon being transferred to lower floor 102 by container lift 142, destination container 146 may be transferred to delivery area 150 by drive unit 140 designed to load and transport the destination container. In another example, if only container 146 is transported by container lift 142, container lift 142 may be designed to eject destination container 146 onto the top of a drive unit (e.g., via gravity rollers).

Delivery area 150 may include one or more loader 152, which may be a robotic device that is designed to grab a package from the destination container and place the package into a delivery container. For example, loader 152 may have a robot arm with a robotic hand or grasper and may have multiple degrees of freedom (e.g., 6). Alternatively, or additionally, a human may manually load packages from the destination container into the delivery container.

Loader 152 may retrieve a package from a destination container in delivery area 150 (e.g., destination container 156) and may strategically place a package into a delivery container in delivery area 150 (e.g., delivery container 154) in a manner that optimizes space in delivery container 154. Destination container 153, which may be another destination container similar to destination container 154, may also be positioned in delivery area 150 and may be assigned to delivery area 150. Loader 152 may load delivery container 154 with packages from destination container 154 and/or 153. It is understood that any number of destination containers may be assigned to delivery area 150 and positioned in delivery area 150 within reach of loader 152 for loading packages in delivery container 154. Delivery container 154 may be any delivery container designed to be loaded onto a delivery vehicle (e.g., box, Gaylord, pallet containers, bulk boxes, pallet boxes, bulk bins, and the like).

Illustrative Process and Use Cases

Figure 2:
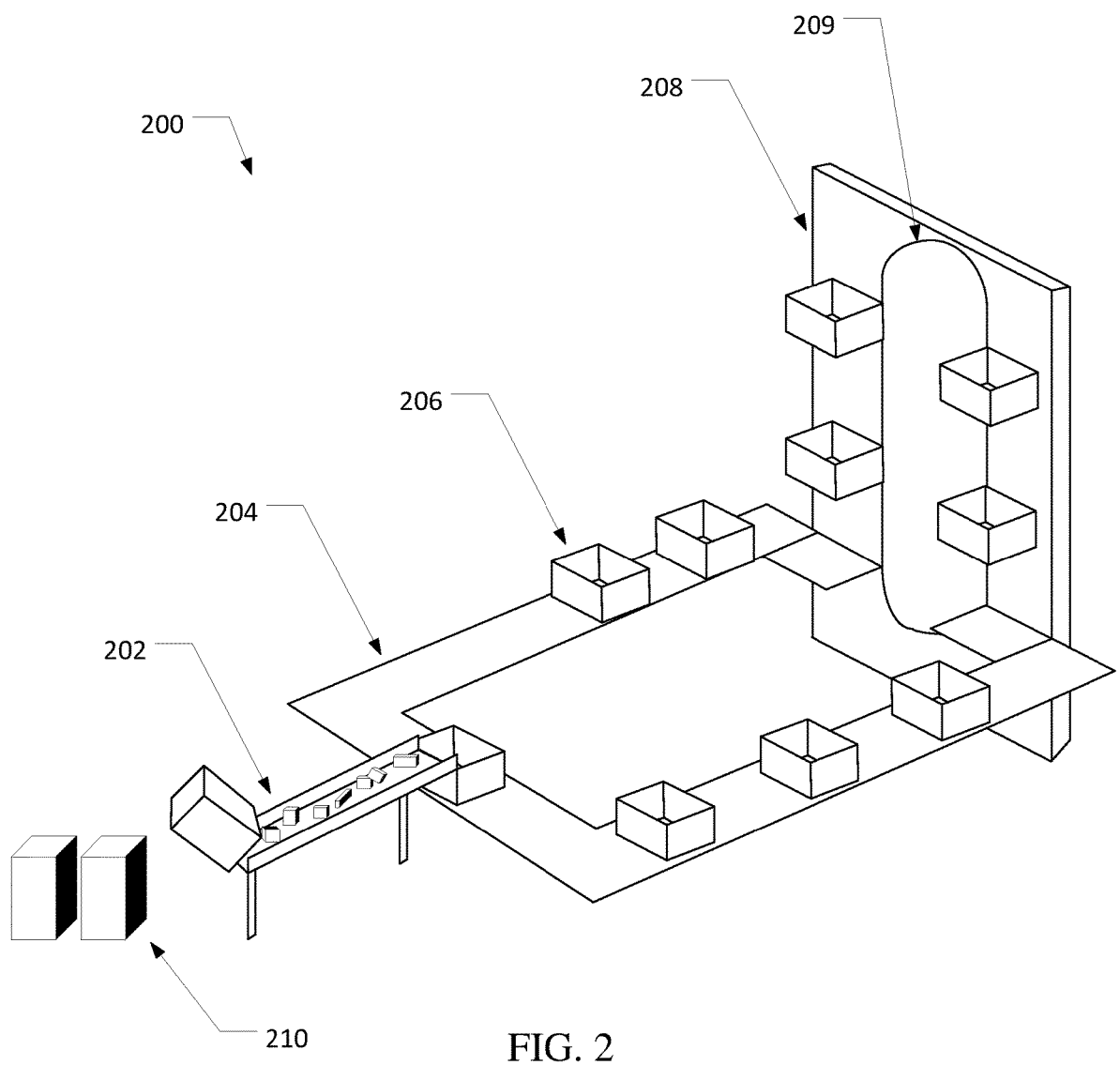
FIG. 2 is a schematic illustration of an example use case of a receiving area of the packaging sorting system with a receiving conveyor in accordance with one or more exemplary embodiments of the disclosure.

Referring to FIG. 2, an exemplary receiving area of a package sorting system (e.g., package sorting system 100 of FIG. 1) with a receiving conveyor is illustrated. Specifically receiving area 200 is illustrated having receiving conveyor 202, lift conveyor 204, and containers 206. Receiving conveyor 202 and/or lift conveyor 204 may include one or more computing devices for controlling receiving container 202 and/or lift container 204 and/or may be in communication with a computing device overseeing the package sorting system (e.g., computing device 110 of FIG. 1). It is understood that receiving area 200 may be the same or similar to receiving area 106 of FIG. 1 and/or container lift container lift 208 may be the same or similar to container lift 114 of FIG. 1. Container lift 208 may include a rotating track in inner loop 209 which may support one or more containers (e.g., container 206) and lift the container from the first level to the second level as the rotating track rotates.

As shown in FIG. 2, packages may be received at receiving area 200 in one or more shipping containers 210. For example, shipping containers 210 may be a Gaylord container or any other container. Containers 210 may be manually unloaded onto container lift 208 or may be loaded onto a tilting device for unloading packages of containers 210 onto receiving conveyor 202. Receiving conveyor 202 may be any type of well-known conveyor system (e.g., conveyor belt or surface, gravity rollers, chute, etc.).

Receiving conveyor 202 and lift conveyor 204 may be coordinated such that lift conveyor 204 may support containers 206, which may be the same as container 112 of FIG. 1 and lift conveyor 204 may cause container 206 to maintain its position with respect to receiving conveyor 202 to permit container 206 to fill up with packages from receiving conveyor 202. In one example, container 206 may have a sensor (e.g., proximity sensor and/or optical sensor) on a rim of container 206 and may determine when container 206 is full and instruct a computing device of the package sorting system that container 206 is full. Alternatively, or additionally, container 206 may be manually advanced to the lift and/or may be advanced based on a signal (e.g., signal that packages in container 206 must be advanced to lift to avoid delaying delivery).

Once container 206 is sufficiently filled with packages, lift conveyor may advance the conveyor system to eject container 206 onto container lift 208. Lift conveyor 204 may be any well-known type of conveyor system and may be U-shaped such that lift conveyor 204 may load full containers onto container lift 208 and receive empty containers from container lift 208. It is understood that container lift 208 may be any type of lift capable of transferring containers from a first floor to a second floor and vice versa. Container lift 208 may alternatively be an elevator.

Figure 3:
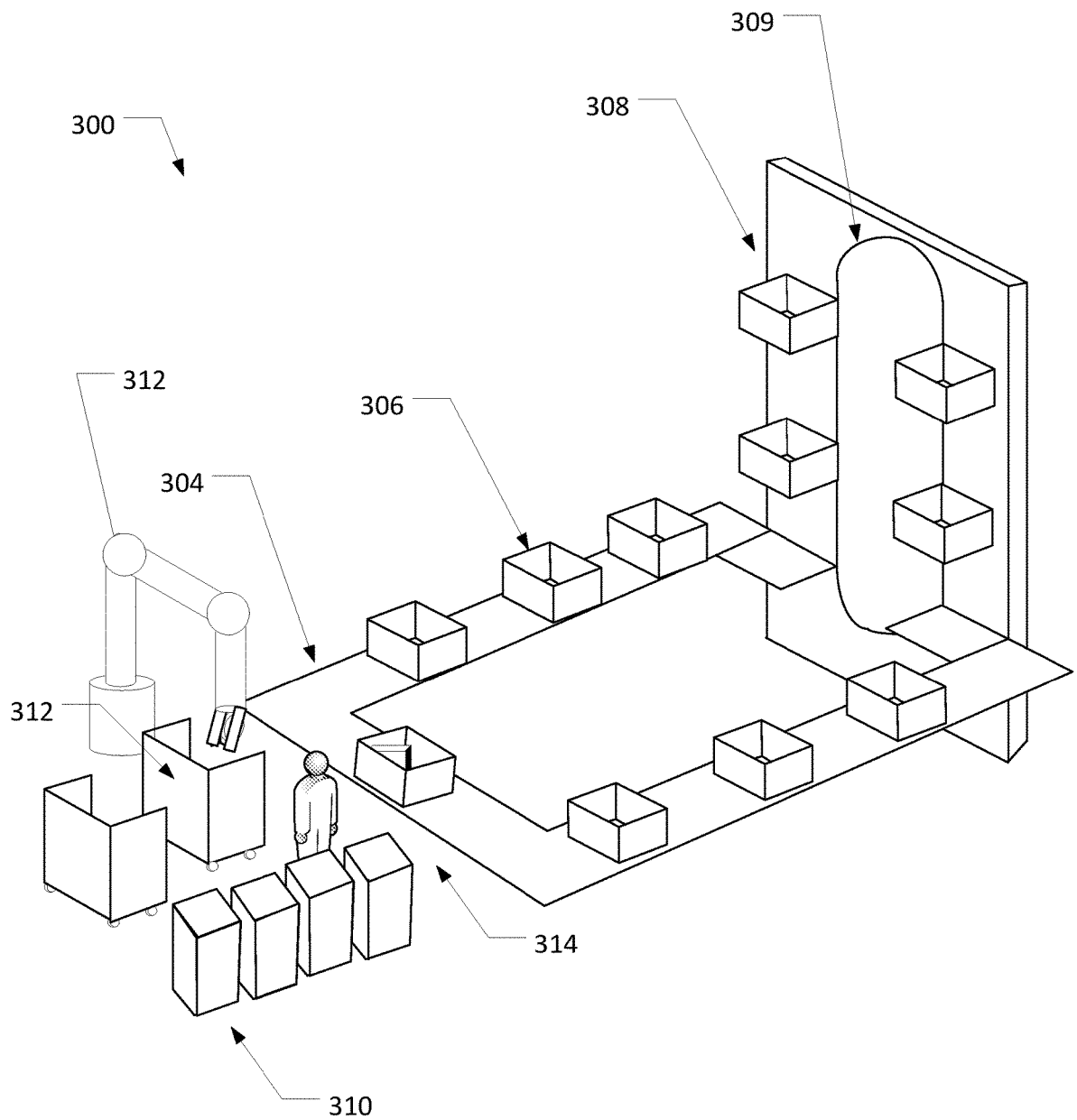
FIG. 3 is a schematic illustration of an example use case of a receiving area of the packaging sorting system with a manual loading area in accordance with one or more exemplary embodiments of the disclosure.

Referring to FIG. 3, an exemplary receiving area of a package sorting system (e.g., package sorting system 100 of FIG. 1) with a manual loading area is illustrated. Specifically receiving area 300 is illustrated having lift conveyor 304, and containers 306, and container lift 308. It is understood that receiving area may be the same or similar to receiving area 106 of FIG. 1 and/or container lift container lift 308 may be the same or similar to container lift 114 of FIG. 1. Container lift 308 may include a rotating track in inner loop 309 which may support one or more containers (e.g., container 306) and lift the container from the first level to the second level as the rotating track rotates.

As shown in FIG. 3, packages may be received at receiving area 300 in one or more shipping containers 310 and/or trolleys 312. For example, shipping containers 310 may be a Gaylord container or any other container and trolleys 312 may be any type of wheeled container for transporting packages. Containers 310 and/or trolleys 312 may be positioned near loading area 314 of lift conveyor 304. One or more individuals may similarly be positioned near loading area 314 of lift conveyor 304. One or more robotic systems 312, which may include a robotic arm for grasping packages, may optionally be included near loading area 314.

One or more individuals in loading area 314 may manually remove packages from shipping containers 310 and/or trolleys 312 and fill containers 306 positioned on lift conveyor 304. The individual in loading area 314 may control lift conveyor 304 or alternatively, one or more computing device (e.g., computing device 110 of FIG. 1) may control lift conveyor 304. For example, containers 306 may have a sensor (e.g., proximity sensor) on the rim of container 306 for determining when container 306 and sensor information may be communicated to the computing device to determine when and how to move lift conveyor 304. It is understood that robotic system 312 may additionally, or alternatively, load packages from shipping containers 310 and/or trolleys 312 into containers 306.

Figure 4:
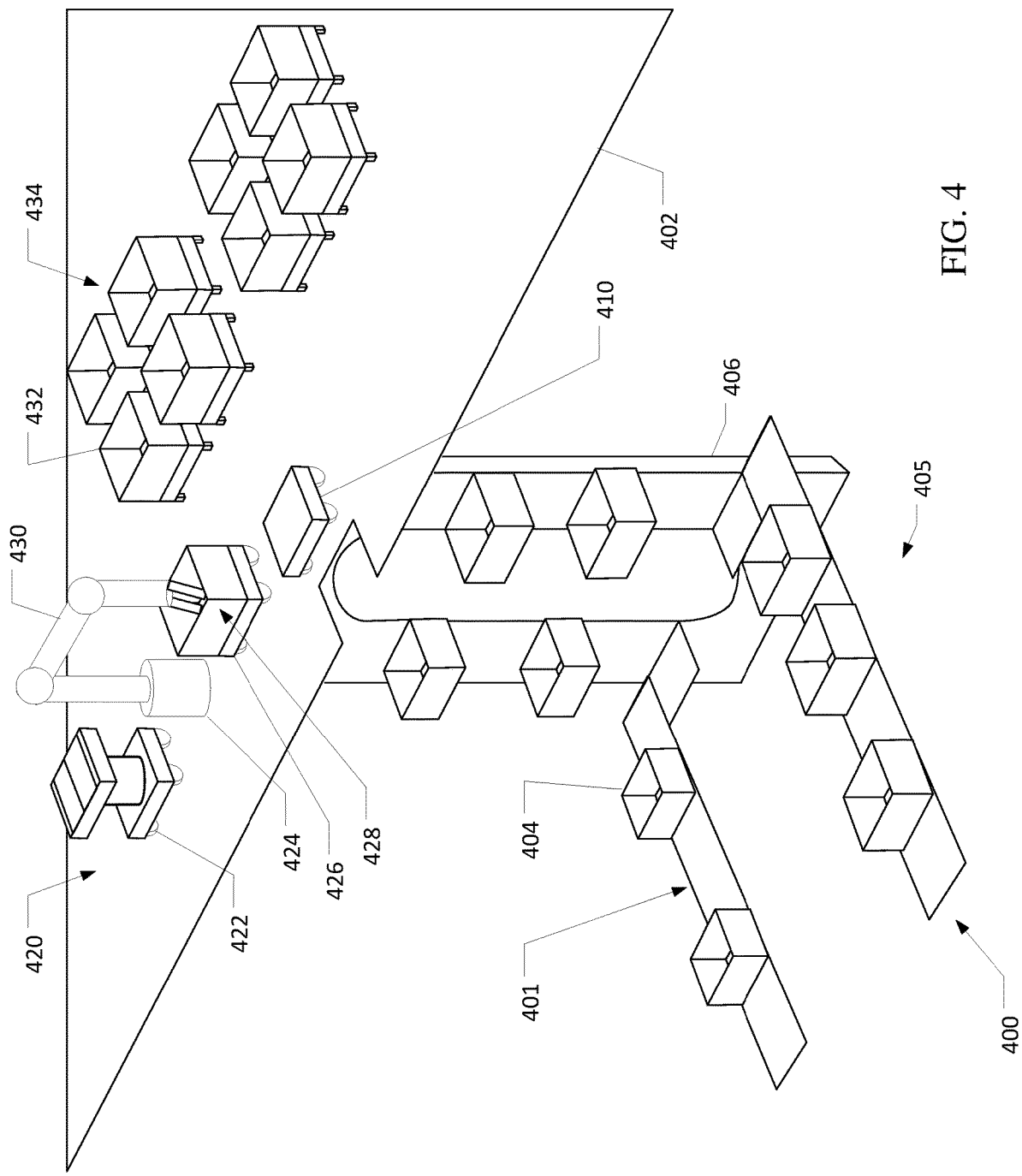
FIG. 4 is a schematic illustration of an example use case of a container lift system and an unloading area in accordance with one or more exemplary embodiments of the disclosure.

Referring now to FIG. 4, an exemplary receiving area and unloading area of a package sorting system (e.g., package sorting system 100 of FIG. 1) is illustrated. Receiving area 400 may be located on first floor 405 and may be the same or similar to receiving area 106 of FIG. 1. Receiving area 400 may include lift conveyor 401 that may support and convey containers 404. Lift conveyor 401 and containers 404 may be the same as or similar to lift conveyor 116 and containers 112 of FIG. 1. Lift conveyor 401 may eject or otherwise load containers 404 onto container lift 406 which may transport containers from first floor 405 to second floor 402. Container lift 406 may be the same or similar to container lift 114 of FIG. 1.

Container 404 may be ejected or otherwise unloaded from container lift 406 onto second floor 402. For example, container lift 406 may raise container 404 higher than second floor 402 and may eject container 404 onto drive unit 410 which may be waiting for container lift 406. Drive unit 410 may be the same or similar to drive unit 120 of FIG. 1 and may otherwise be designed to load, support, and/or transport container 404 across second floor 402. For example, drive unit 410 may transport container 404 to unloading area 420. It is understood that unloading areas (e.g., unloading area 420) may be distributed around a perimeter of second floor 402 and destination containers 432 may be positioned on an interior of second floor 402 in sorting area 434.

As shown in FIG. 4, unloading area 420 may include unloader 424, package drive unit 422, drive unit 426 and container 428 positioned upon drive unit 426. Container 428 may be the same type of container as container 404 and may include several packages loaded on first floor 405. Unloader 424 may be the same as unloader 126 and may include robotic arm 430 for grabbing and/or grasping packages. Package drive unit 422 may be designed to load, support, transport, and deposit packages into destination containers 432. Package drive unit 422 may be the same or similar to package drive unit 128 of FIG. 1 and/or package drive unit 522 of FIG. 5. Destination container 423 may be the same as destination container 130 of FIG. 1.

Unloader may grab a package from container 428 and place the package onto package drive unit 422. Unloader may include a scanning device (e.g., barcode, label, and/or RFID scanner) and may determine destination information (e.g., destination address, delivery route, delivery vehicle) about the package and may inform drive unit 422 and/or a computing device (e.g., computing device 110 of FIG. 110) of such information. Alternatively, the scanning device may be a standalone device. Package drive unit 422 may be informed of the destination information (e.g., from scanning device and/or computing device 110) and may determine a destination container corresponding to the destination information. For example, package drive unit 422 may transport the package to destination container 432 and deposit the package into destination container 432.

Figure 5:
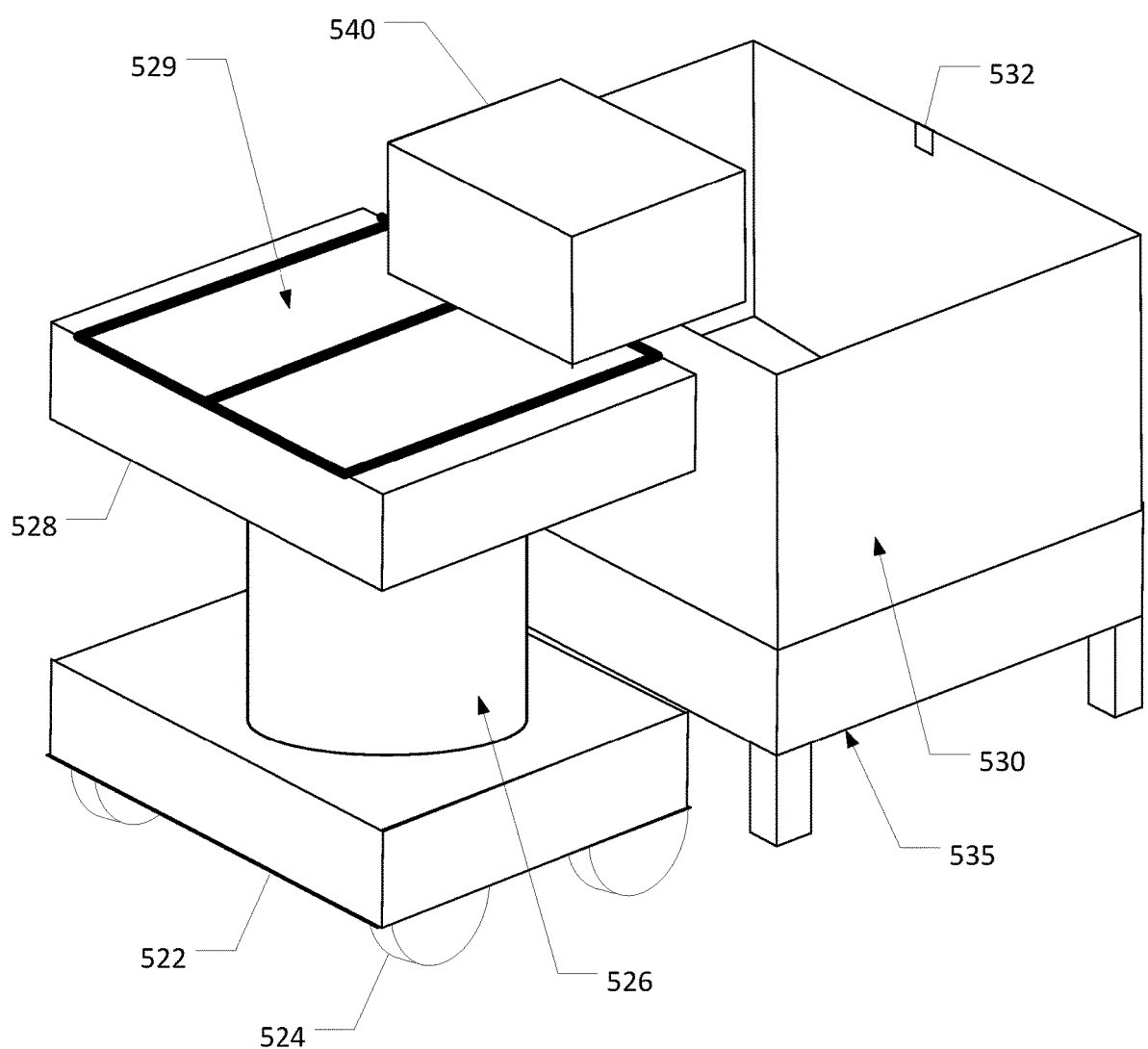
FIG. 5 is a perspective view of an exemplary package drive unit and a destination container in accordance with one or more exemplary embodiments of the disclosure.

Referring now to FIG. 5, an exemplary package drive unit and destination container of package sorting system (e.g., package sorting system 100 of FIG. 1) is illustrated. Package drive unit 522 may be the same as or similar to package drive unit 128 of FIG. 1. For example, package drive unit 522 may include wheels 524, an electric engine or other propulsion system (not shown), base 526, support 528 and conveyor 529. Base 526 may have an adjustable height to raise and/or lower support 528. Conveyor 529 may be any type of conveyor system and/or package ejection system. In one example, conveyor 529 may be a split conveyor belt having two independently operable conveyor belts. In one example, the unloader (e.g., unloader 126 of FIG. 1) may load one package on one of the split conveyors and another package on the other split conveyor. It is under stood that each package may be selectively and independently deposited into the same destination container or different destination containers.

Base 526 may be adjusted such that a height of conveyor 529 is the same height or higher than destination container 530. Package drive unit 522 may support package 540 on conveyor 529 and may drive to destination container 530 such that conveyor 529 is adjacent to a rim of destination container 530. In one example, package drive unit 522 may have autonomous driving capabilities and/or may receive direction from the computing device (e.g. computing device 110 of FIG. 1). Alternatively, package drive unit 522 may be directed from signals or information from the floor or elsewhere. Drive unit 522 may activate conveyor 529 to advance package towards destination container 530 to deposit package 540 into destination container 530.

Destination container 530 may be the same as or similar to destination container 130 of FIG. 1. Destination container 530 may optionally incorporate, include and/or be support by container stand 535 which may position destination container 530 off of the floor and create a space between destination container 530 and the floor. It is understood that a drive unit may be sized to fit beneath destination container 530 to load the destination container on top of the drive unit. Destination container 530 may include sensor 532, which may be any sensor for determining that destination container 530 is full (e.g., a proximity sensor and/or optical sensor). The sensor may generate a sensor value that may be compared to a threshold value indicating that the container is full.

Figure 6:
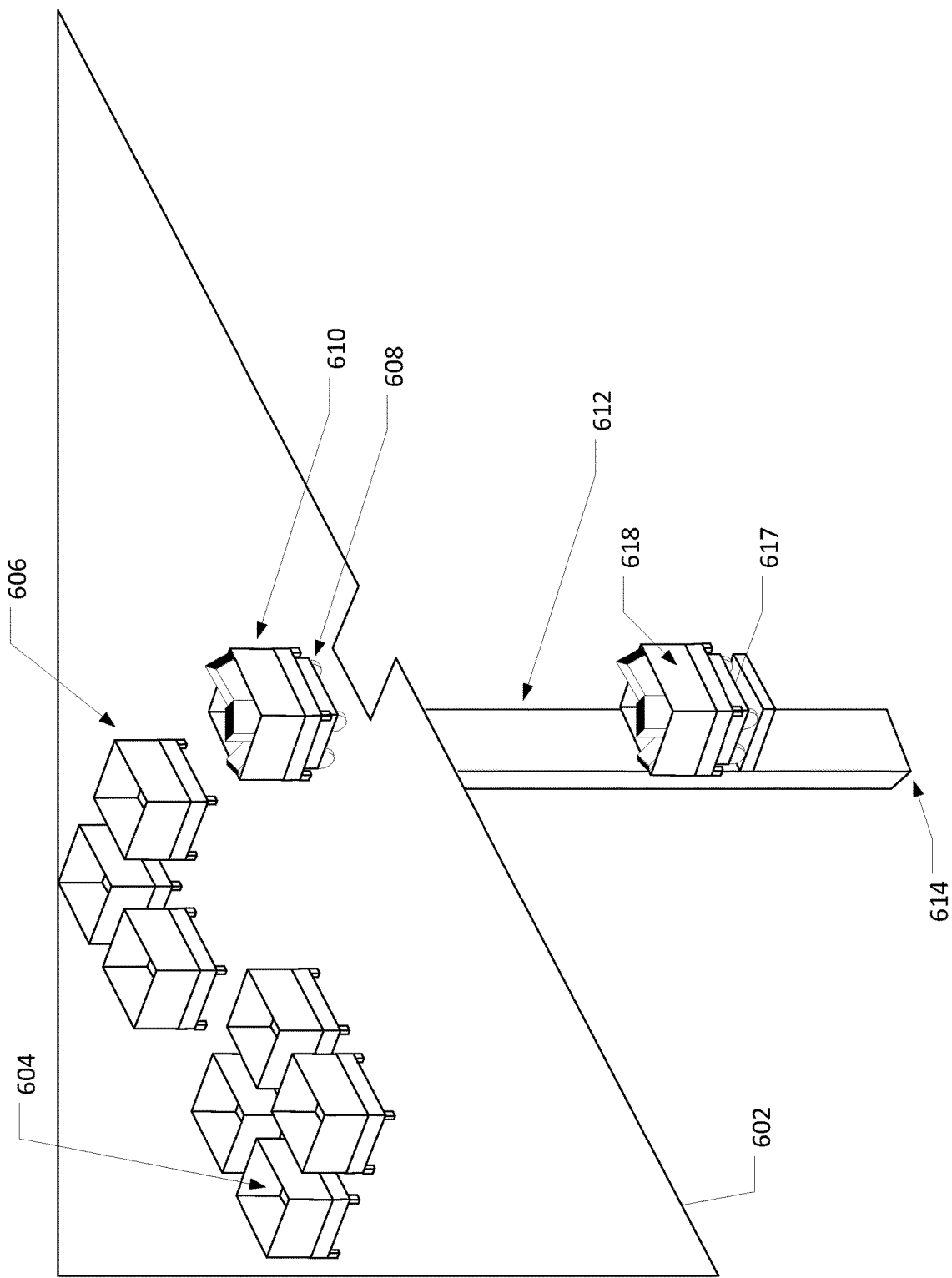
FIG. 6 is a schematic illustration of an example use case of a container lift system adjacent to a delivery area in accordance with one or more exemplary embodiments of the disclosure.

Referring now to FIG. 6, an exemplary sorting area, container lift, and lift conveyor of a package sorting system (e.g., package sorting system 100 of FIG. 1) is illustrated. Sorting area 606 may be located on an interior area of second floor 602 and may be the same as sorting area 132 of FIG. 1. For example, sorting area may include destination containers 604 arranged in pods, rows, and/or columns.

Destination container 604 may be the same as destination container 130. Once a destination container is full of packages, a drive unit (e.g., drive unit 608) may load the destination container and transport the destination container to container lift 612. Alternatively, or additionally, container 604 may be manually advanced to the container lift and/or may be advanced based on a signal (e.g., signal that packages in container 604 must be advanced to lift to avoid delaying delivery).

Container lift 612 may transfer both a container (e.g., destination container) and a drive unit (e.g., drive unit 608) between second floor 602 and first floor 614. Alternatively, container lift 612 may be the same as or similar to container lift 142 and/or may only transport the container. As shown in FIG. 6, container lift 612 may transfer a destination container 618 and drive unit 617 from second floor 602 to first floor 614. Drive units 608 and 617 may be the same or similar to drive unit 140 and/or drive unit 144 of FIG. 1. It is further understood that container 604 may always have a drive unit positioned below, or otherwise may always be in contact with a drive unit to navigate second floor 602 and first floor 614. Alternatively, container 604 may be positioned at different positions on first floor 614 and second floor 602 and a drive unit may be summoned when it is necessary to move container 604. It is understood that a chute or other conveyor system may be alternatively used to transfer a destination container from second floor to 602 to first floor 614.

Figure 7:
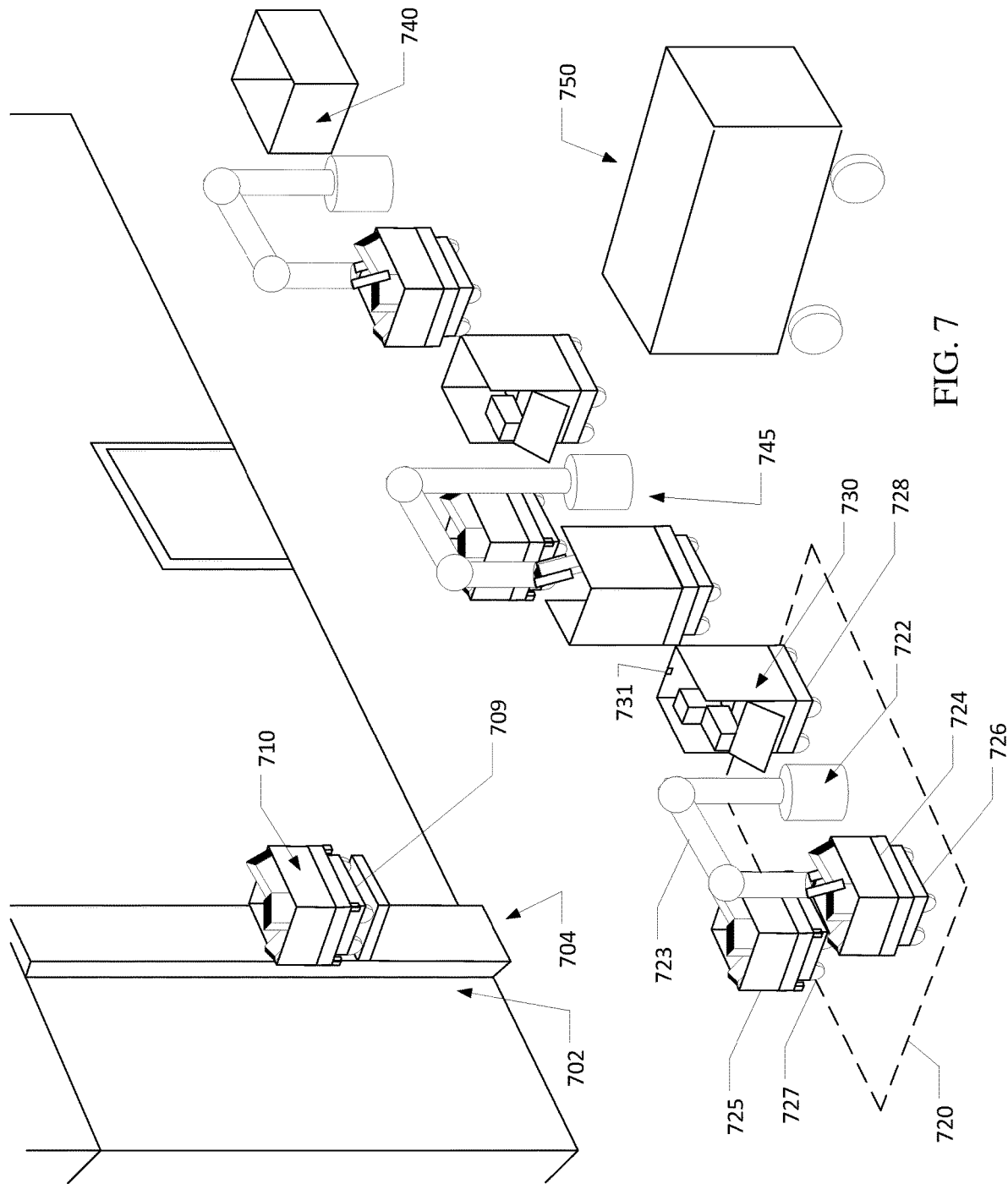
FIG. 7 is a schematic illustration of an example use case of several delivery areas adjacent to the container lift system in accordance with one or more exemplary embodiments of the disclosure.

Referring now to FIG. 7, an exemplary container lift and delivery area of a package sorting system (e.g., package sorting system 100 of FIG. 1) is illustrated. As shown in FIG. 7, container lift 702 may transfer a container (e.g., destination container 710, destination container 725 and/or destination container 724) and a drive unit (e.g., drive unit 709m drive unit 727 and/or drive unit 726) from a second story to first floor 704. In another example, container lift 702 may only transfer containers and may deposit the container at first floor 704 onto a conveyor from which packages may be selectively removed (e.g., manually or using a robotic system) and placed onto a container that may be transported to a delivery area. Container lift 702 may be strategically positioned near delivery areas (e.g., delivery area 720) on first floor 704. Each delivery area may be arranged near or adjacent to a delivery vehicle loading area. For example, delivery area 720 may be positioned near delivery vehicle 750. Delivery area 720 may include loader 722, which may be within reach of delivery container 730, destination container 724, and/or destination container 725. Delivery container 730 may include sensor 731, which may determine when a container is full (e.g., via a proximity or optical sensor) and may be the same or similar to delivery container 134 of FIG. 1. Once delivery container 730 is sufficiently full (e.g., based on sensor 731) and/or upon receiving a manual or automated signal to load delivery container 730, delivery container 730may be loaded into delivery vehicle 750. Delivery container 730 may be loaded onto drive unit 728, may be loaded on a delivery container transporter (e.g., a cart with wheels designed to be pushed manually) and/or may rest on the ground or a support (e.g., a pallet). Delivery container 740 may be positioned on the ground and/or a support. Drive unit 728 may be similar to drive unit 708 and may support a delivery container.

Loader 722 may be the same as or similar to loader 152 of FIG. 1. For example, may be a robotic device that may include robotic arm 723 for grabbing and/or grasping packages. The robotic arm may have several degrees of movement (e.g., six-degrees). Destination containers 724 and/or 725 may be transported to delivery area 720 via drive unit 726 and drive unit 727, respectively, which may be the same as drive unit 708.

Loader 722 may retrieve packages from destination container 724 and/or destination container 725 and strategically position each package into delivery container 730 in a manner that optimizes space in delivery container 730. It is understood that any number of destination containers may be positioned in delivery area 720 and may be sequentially arranged in the delivery area (e.g., based on positions of delivery stops along a delivery route). Alternatively, packages from one or more destination containers may be merely dumped into a delivery container (e.g., delivery container 740), either manually or via a robotic dumping device that aides in lifting and overturning a destination container into a delivery container. In one example, the foregoing dumping approach may be employed when the packages in the destination container are relatively small and/or are pouches and/or bags.

Once delivery container 730 is loaded, delivery container may be loaded into delivery vehicle 750. It is understood that delivery container 730 may include sensor 731 (e.g., proximity sensor and/or optical sensor) for determining whether delivery container 730 is full. Once full, or upon receiving an automated or manual signal, delivery container 730 may send a message to loader 722 and/or a computing device (e.g., computing device 110) indicating that delivery container 730 is full. Once full, drive unit 728 may transport delivery container 730 to delivery vehicle 750 and/or delivery container 730 may manually transport delivery container 730 to delivery vehicle 750.

As shown in FIG. 7, delivery area 745 may be an optional delivery area having two or more delivery containers. It is understood that one or more destination containers may be positioned in delivery area 745 and a loader in delivery area 745 may unload packages in the one or more destination containers into one of the two delivery containers. It is understood that more than two delivery containers may be included in delivery area 745 and/or each delivery container may be loaded onto the same delivery vehicle or different vehicles.

Figure 8:
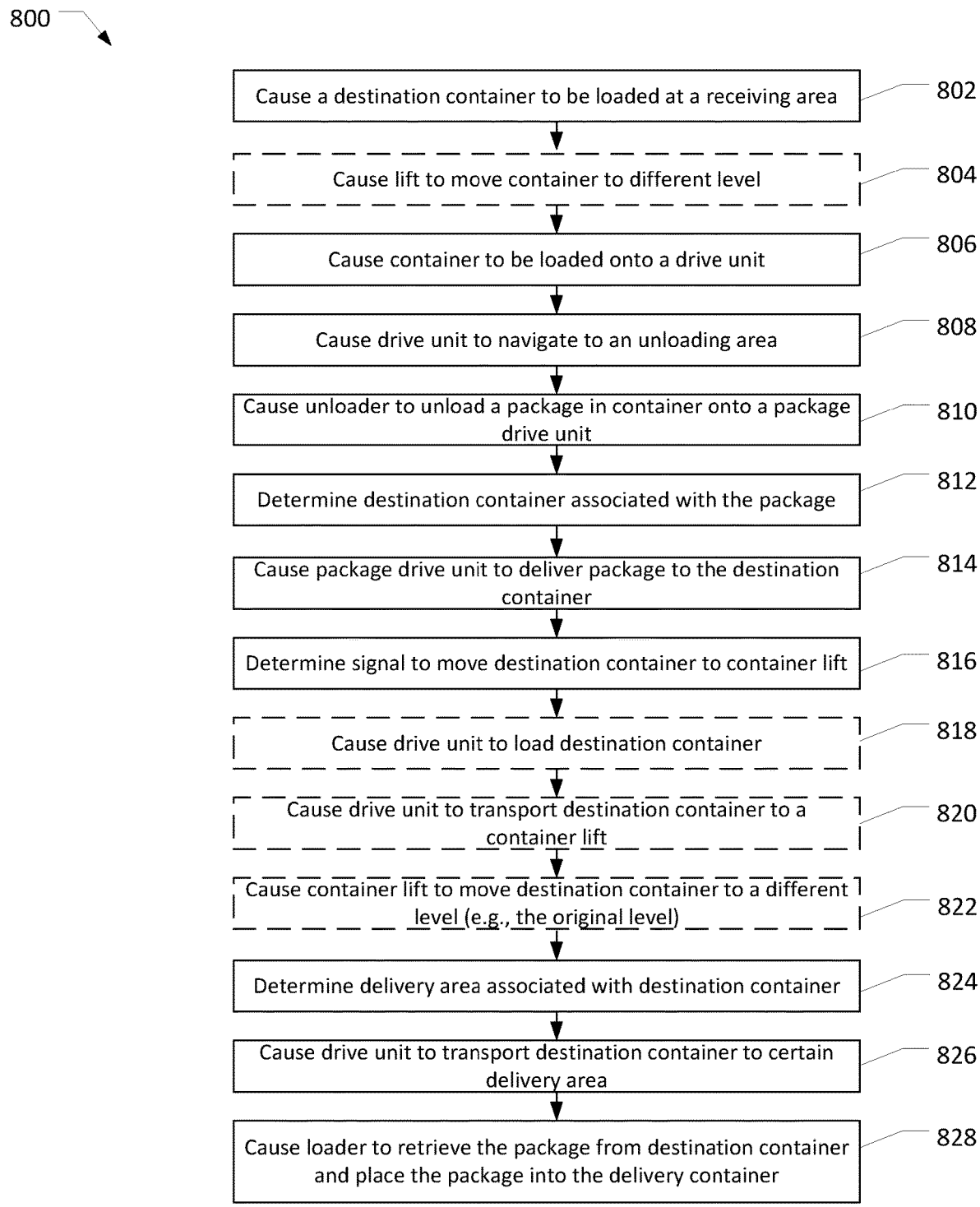
FIG. 8 is an example process flow for a delivery system for receiving, sorting, and distributing packages for delivery in accordance with one or more example embodiments of the disclosure.

Referring now to FIG. 8, example process flow 800 of a package sorting system is depicted for receiving, inducting, sorting, and/or delivering packages in accordance with one or more exemplary embodiments of the disclosure. To initiate package sorting system, at block 802 computer-executable instructions stored on a memory of a device, such as a computing device, may be executed to cause a container to be loaded with packages at a receiving area (e.g., either manually or using a conveyor system).

At optional block at block 803 computer-executable instructions stored on a memory of a device, such as a computing device, may be executed to cause the container in the receiving area to be loaded onto a container lift and raised to another floor (e.g., a second floor above the receiving area). At optional block at block 806 computer-executable instructions stored on a memory of a device, such as a computing device, may be executed to cause the container to be loaded onto a drive unit. For example the container lift may eject the container and the container may slide via gravity rollers to a drive unit.

At optional block at block 808 computer-executable instructions stored on a memory of a device, such as a computing device, may be executed to cause the drive unit to navigate to an unloading area. At optional block at block 810 computer-executable instructions stored on a memory of a device, such as a computing device, may be executed to cause an unloader to unload a package in the container onto a package drive unit.

At at block 812 computer-executable instructions stored on a memory of a device, such as a computing device, may be executed to determine a destination container associated with the package (e.g., via a bar code). It is understood that block 812 may occur before block 810. At block 814 computer-executable instructions stored on a memory of a device, such as a computing device, may be executed to cause the package drive unit to deliver the package to the destination container associated with the package.

At block 816 computer-executable instructions stored on a memory of a device, such as a computing device, may be executed to determine a signal to move the destination container to a container lift. For example, the signal may indicate that the destination container is sufficiently full (e.g., based on a signal from a proximity and/or optical sensor) or that the container must be moved to avoid delaying delivery of packages in the destination container. At optional block 818, computer-executable instructions stored on a memory of a device, such as a computing device, may be executed to cause a drive unit to load the destination container onto the drive unit or otherwise engage the destination container. Alternatively, the destination container may already be loaded onto the drive unit or otherwise engaged with the drive unit. At optional block 820, computer-executable instructions stored on a memory of a device, such as a computing device, may be executed to cause the drive unit to transport the destination container to a container lift.

At optional block 822, computer-executable instructions stored on a memory of a device, such as a computing device, may be executed to cause the container lift to transport the destination container and the drive unit to a different level (e.g., to the second level). At block 824 computer-executable instructions stored on a memory of a device, such as a computing device, may be executed to determine a delivery area associated with the destination container.

At block 826 computer-executable instructions stored on a memory of a device, such as a computing device, may be executed to cause the drive unit to transport the destination container to a certain delivery area associated with the destination container. At block 828 computer-executable instructions stored on a memory of a device, such as a computing device, may be executed to cause the loader to remove the package from the destination container and place the package into the delivery container.

Figure 9:
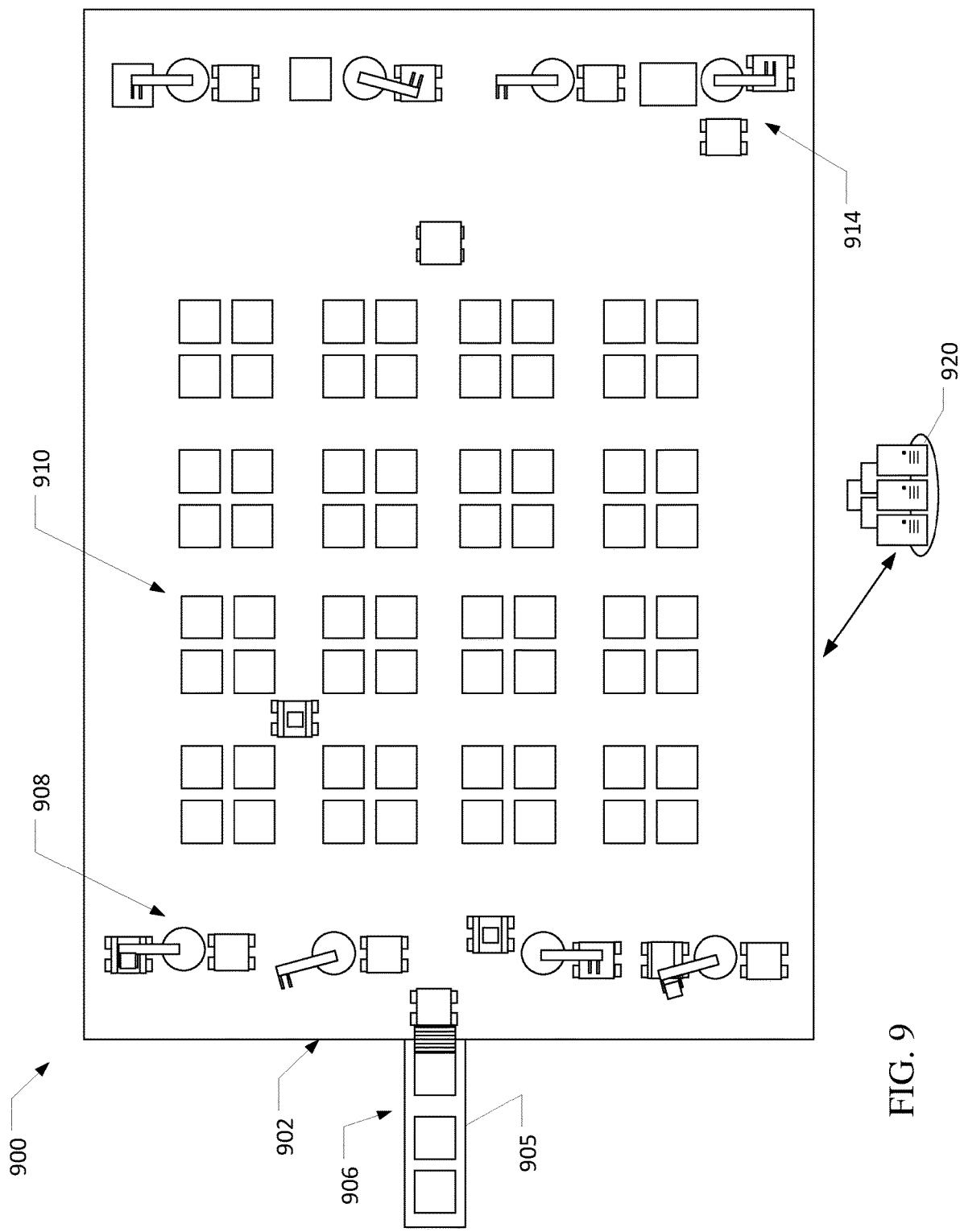
FIG. 9 is a schematic illustration of an example use case of a single-level package sorting system in accordance with one or more exemplary embodiments of the disclosure

Referring to FIG. 9, an example use case of a single-level package sorting system 900 is depicted in accordance with one or more exemplary embodiments of the disclosure. Package sorting system 900 may be similar to package sorting system 100 of FIG. 1, except that package sorting system 900 may be located on a single floor or level and container lift 114 and container lift 142 of FIG. 1 may be removed. Computing device 920 may be the same as or similar to computing device 110 of FIG. 1.

As shown in FIG. 9, package receiving area 906 may be the same as or similar to package receiving area 106, unloading area 908 may be the same as or similar to unloading area 122, sorting area 910 may be the same as or similar to sorting area 132, and delivery area 914 may be the same as or similar to delivery area 150 of FIG. 1. It is understood that conveyor 905 may replace lift conveyor 116 of FIG. 1 and may transport a container directly to a drive unit waiting to load the container on first floor 902, without the need for a container lift. It is further understood that one or more drive unit may drive destination containers directly to delivery area 914, without the need for a container lift.

Illustrative Device Architecture

Figure 10:
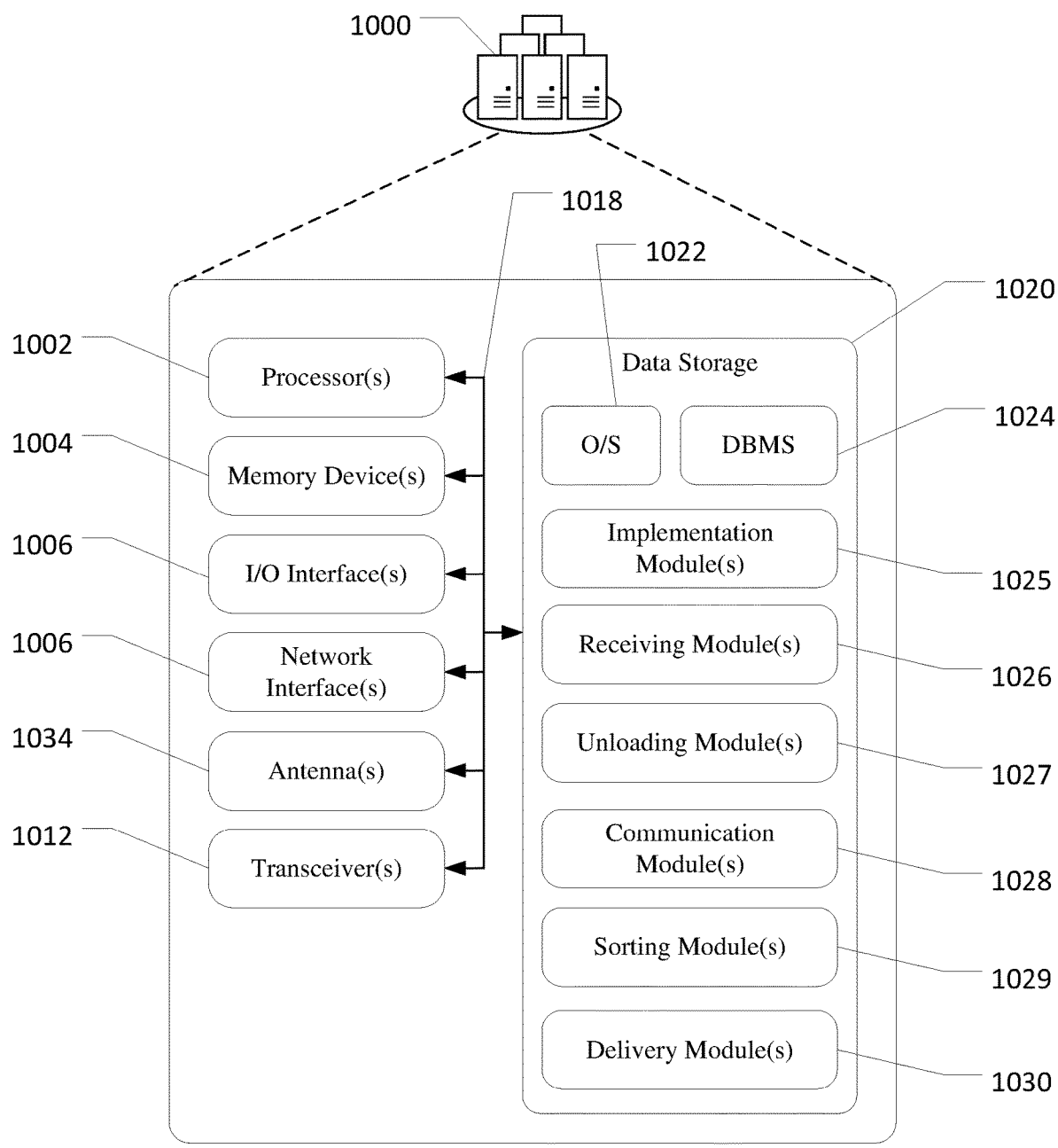
FIG. 10 is a schematic block diagram of a computing device in accordance with one or more exemplary embodiments of the disclosure.

FIG. 10 is a schematic block diagram of an illustrative computing device 1000 of the package sorting system in accordance with one or more exemplary embodiments of the disclosure. The computing device 1000 may be any suitable computing device capable of receiving and/or sending data and/or controlling a conveyor, container lift, drive unit, loader, unloader, and/or any other component of the multi-level or single-level package container system. Computing device 1000 may optionally be coupled to and/or communicate with devices including, but not limited to, sensors, cameras, controllers, computing devices and/or one or more servers, or the like. The computing device 1000 may correspond to computing device 110, computing device 920 and/or any other computing device of FIGS. 1-9.

The computing device 1000 may be configured to communicate via one or more networks with one or more servers, robotic systems, conveyors, lifts, sensors, controllers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The computing device 1000 may further include one or more buses 1018 that functionally couple various components of the computing device 1000. The computing device 1000 may further include one or more antenna (e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the computing device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more receiving module(s) 1026, one or more unloading module(s) 1027, one or more communication module(s) 1028, one or more sorting module(s) 1029 and/or one or more delivery module(s) 1030. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the computing device 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the computing device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining user selected actions and tasks, determining actions associated with user interactions, determining actions associated with user input, sending and receiving signals and/or data to and from one or more sensors, controllers, other computing devices, servers, datastores and the like, initiating commands locally or at remote computing devices, and the like.

Receiving module 1026 may include computer-executable instructions, code, or the like that responsive to execution by one or more of the processor(s) 1002 may perform functions including, but not limited to controlling on or more conveyor systems supporting and transporting one or more containers. Receiving module 1026 may cause the conveyor to deliver the container to a container lift and may cause the container lift to transfer the container to a different floor.

Unloading module 1027 may include computer-executable instructions, code, or the like that responsive to execution by one or more of the processor(s) 1002 may perform functions including, but not limited to controlling components in unloading areas that may include an unloader and may further include controlling drive units that transport containers from the receiving area, sorting area and/or container lifts.

The communication module(s) 1028 may include computer-executable instructions, code, or the like that responsive to execution by one or more of the processor(s) 1002 may perform functions including, but not limited to, communicating with one or more cameras, controllers, conveyor belts, conveyor systems, sensors, devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The sorting module 1029 may include computer-executable instructions, code, or the like that responsive to execution by one or more of the processor(s) 1002 may perform functions including, but not limited to, controlling a package drive unit to deliver a package to a certain destination container, determining when a destination container is full, and causing a drive unit to transport a destination container to a container lift.

The delivery module 1030 may include computer-executable instructions, code, or the like that responsive to execution by one or more of the processor(s) 1002 may perform functions including, but not limited to, causing a container lift to transfer a container from one floor to another, cause a drive unit to transport a destination container from a container lift to a delivery area, control a loader to transfer packages from a destination container to a delivery container, and/or cause a drive unit to transport a delivery container to a delivery vehicle.

Referring now to other illustrative components depicted as being stored in the data storage 1020, the O/S 1022 may be loaded from the data storage 1020 into the memory 1004 and may provide an interface between other application software executing on the computing device 1000 and hardware resources of the computing device 1000. More specifically, the O/S 1022 may include a set of computer-executable instructions for managing hardware resources of the computing device1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 1000 is a mobile electronic device, the DBMS 1024 may be any suitable light-weight DBMS optimized for performance on a mobile device.

Referring now to other illustrative components of the computing device 1000, the optional input/output (I/O) interface(s) 1006 may facilitate the receipt of input information by the computing device 1000 from one or more I/O devices as well as the output of information from the computing device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna (e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1000 may further include one or more network interface(s) 1008 via which the computing device 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna (e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna (e) 1034 may be communicatively coupled to one or more transceivers 1012 or radio components to which or from which signals may be transmitted or received.

As previously described, the antenna (e) 1034 may include a Bluetooth antenna configured to transmit or receive signals in accordance with established standards and protocols, such as Bluetooth and/or BLE. Alternatively, or in addition to, antenna (e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 1034 may be configured to transmit or receive radio frequency signals within any suitable frequency range forming part of the unlicensed portion of the radio spectrum (e.g., 900 MHz).

The antenna (e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna (e) 1034—transmitting or receiving radio frequency (RF) signals in the bandwidth and/or channels corresponding to the communications protocols utilized by the computing device 1000 to communicate with other devices. The transceiver(s) 1012 may include hardware, software, and/or firmware for modulating, transmitting, or receiving—potentially in cooperation with any of antenna (e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computing device 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1000 and/or hosted on other computing device (s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computing device 1000 may include alternate and/or additional hardware, software, or firmware components beyond those described or depicted without departing from the scope of the disclosure. More particularly, it should be appreciated that software, firmware, or hardware components depicted as forming part of the computing device 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method for transferring delivery packages to a delivery area, the method comprising:

conveying, on a first floor, a first container having a first package associated with a first address and a second package associated with a second address to a first container lift;

causing the first container lift to move the first container vertically from a first floor to a second floor;

causing a first drive unit on the second floor to load the first container;

causing the first drive unit to transport the first container to an unloading area having an unloader;

causing the unloader to unload the first package from the first container and place the first package onto a second drive unit located in the loading area;

causing the second drive unit to transport the first package to a second container corresponding to the first address and having a third package corresponding to a third address, the third address and the first address associated with a first delivery container;
causing the second drive unit to deposit the first package into the second container;
determining that the second container has a load value that satisfies a load threshold value;
causing a third drive unit to load the second container based on the load value satisfying the load threshold value;
causing the third drive unit to transport the second container to a second container lift;
causing the second container lift to move the second container vertically from the second floor to the first floor; and
determining a first loading area on the first floor based on the first address, the loading area having a loader and the first delivery container.

2. The method of claim 1, further comprising:
causing the unloader to unload the second package from the first container and place the second package onto a third drive unit;
causing the third drive unit to transport the second package to a third container corresponding to the second address and having a fourth package corresponding to a fourth address, the second address and fourth address associated with a second delivery container; and
causing the third drive unit to deposit the third package into the third container.

3. The method of claim 1, further comprising:
causing a fourth drive unit to load the first container on the first floor at the second container lift; and
causing the fourth drive unit to transport the first container to the first delivery area based on the first the first address.

4. The method of claim 1, further comprising:
causing the loader to unload the first package from the first container and place the first package into the first delivery container, the first delivery container and adapted to be loaded onto a delivery vehicle.

5. A method comprising:
causing a first container lift to move a first container having a first package corresponding to a first address vertically from a first floor to a second floor;
causing a first drive unit on the second floor to transport the first container to an unloader in an unloading area;
causing an unloader to unload the first package from the first container and place the first package onto a second drive unit;
causing the second drive unit to transport the first package to a second container corresponding to the first address and having a second package corresponding to a second address, the first and second address associated with a first delivery container;
causing a second drive unit to deposit the first package into the second container;
causing a third drive unit to transport the second container to a second container lift;
causing the second container lift to move the second container vertically from the second floor to the first floor; and
determining a first delivery area on the first floor based on the first address.

6. The method of claim 5, further comprising:
causing, at a receiving area, a first conveyor to deposit the first package into the first container positioned on a second conveyor on the first floor; and
causing the second conveyor to move the first container having the first package from the receiving area to the first container lift.

7. The method of claim 5, further comprising:
determining a signal to move the second container to the second container lift.

8. The method of claim 5, further comprising:
causing the first drive unit to load the first container;
causing a scanning device in the unloading area to scan a package identifier on the first package in the first container; and
causing the second drive unit to deposit the first package into the second container based on the package identifier.

9. The method of claim 5, wherein the first container includes a third package having a third address, the method further comprising:
causing the unloader to unload a third package from the first container and place the third package onto a third drive unit;
causing the third drive unit to transport the third package to a third container corresponding to the third address and having a fourth package corresponding to fourth address, the third address and the fourth address associated with a second delivery container; and
causing the third drive unit to deposit the third package at the third container.

10. The method of claim 5, further comprising:
causing a fourth drive unit to load the first container on the first floor at the second container lift; and
causing the third drive unit to transport the first container to the first delivery area based on the first address.

11. The method of claim 5, further comprising:
causing the loader to unload the first package from the first container and place the first package into the first delivery container.

12. The method of claim 5, wherein the first delivery area includes a loader that includes a first robotic arm adapted to hold the first package, and wherein the unloader includes a second robotic arm adapted to hold the first package.

13. A system comprising:
memory configured to store computer-executable instructions, and
at least one computer processor configured to access memory and execute the computer-executable instructions to:
cause a first container lift to move a first container having a first package corresponding to a first address vertically from a first floor to a second floor;
cause a first drive unit on the second floor to transport the first container to an unloader in an unloading area;
cause an unloader to unload the first package from the first container and place the first package onto a second drive unit;
cause the second drive unit to transport the first package to a second container corresponding to the first address and having a second package corresponding to a second address, the first and second address associated with a first delivery container;
cause a second drive unit to deposit the first package into the second container;
cause a third drive unit to transport the second container to a second container lift;
cause the second container lift to move the second container vertically from the second floor to the first floor; and determine a first delivery area on the first floor based on the first address.

14. The system of claim 13, wherein the at least one computer processor is further configured to access memory and execute the computer-executable instructions to:
cause, at a receiving area, a first conveyor to deposit the first package into the first container positioned on a second conveyor on the first floor; and
cause the second conveyor to move the first container having the first package from the receiving area to the first container lift.

15. The system of claim 13, wherein the at least one computer processor is further configured to access memory and execute the computer-executable instructions to:
determine a signal to move the second container to the second container lift.

16. The system of claim 13, wherein the at least one computer processor is further configured to access memory and execute the computer-executable instructions to:
cause the first drive unit to load the first container;
cause a scanning device in the unloading area to scan a package identifier on the first package in the first container; and
cause the second drive unit to deposit the first package into the second container based on the package identifier.

17. The system of claim 13, wherein the first container includes a third package having a third address, and wherein the at least one computer processor is further configured to access memory and execute the computer-executable instructions to:
cause the unloader to unload a third package from the first container and place the third package onto a third drive unit;
cause the third drive unit to transport the third package to a third container corresponding to the third address and having a fourth package corresponding to fourth address, the third address and the fourth address associated with a second delivery container; and
cause the third drive unit to deposit the third package at the third container.

18. The system of claim 13, wherein the at least one computer processor is further configured to access memory and execute the computer-executable instructions to:
cause a fourth drive unit to load the first container on the first floor at the second container lift; and
cause the third drive unit to transport the first container to the first delivery area based on the first address.

19. The system of claim 13, wherein the at least one computer processor is further configured to access memory and execute the computer-executable instructions to:
cause the loader to unload the first package from the first container and place the first package into the first delivery container.

20. The system of claim 13, wherein the first delivery area includes a loader that includes a first robotic arm adapted to hold the first package, and wherein the unloader includes a second robotic arm adapted to hold the first package.

* * * * *